United States Patent [19]

Arcella et al.

[11] Patent Number: 5,264,509
[45] Date of Patent: Nov. 23, 1993

[54] FLUOROELASTOMERS BASED ON VINYLIDENE FLUORIDE EXHIBITING SUPERIOR RESISTANCE TO ORGANIC BASES

[75] Inventors: Vincenzo Arcella, Novara; Margherita Albano; Giulio Brinati, both of Milan; Graziell Chiodini, Varese; Anna Minutillo, Milan, all of Italy

[73] Assignee: Ausimont S.P.A., Milan, Italy

[21] Appl. No.: 15,063

[22] Filed: Feb. 8, 1993

Related U.S. Application Data

[63] Continuation of Ser. No. 738,476, Jul. 31, 1991, abandoned.

[30] Foreign Application Priority Data

May 15, 1991 [IT] Italy ............................ MI91A001339

[51] Int. Cl.⁵ ............................................... C08F 16/24
[52] U.S. Cl. ................................. 526/247; 526/249; 526/254; 526/255
[58] Field of Search ............... 526/247, 249, 254, 255

[56] References Cited

U.S. PATENT DOCUMENTS 4,381,387  4/1983  Sulzbach ........................... 526/247
4,544,720  10/1985  Ohmori et al. ..................... 526/247

FOREIGN PATENT DOCUMENTS 0208314  1/1987  European Pat. Off. ............ 526/247
0359147  3/1990  European Pat. Off. ............ 526/247

OTHER PUBLICATIONS

"Fluoro-elastic copolymers and their production" EP-407937; Albano et al Jan. 16, 1991.

*Primary Examiner*—Joseph L. Schofer
*Assistant Examiner*—N. Sarofin
*Attorney, Agent, or Firm*—Bryan Cave

[57] ABSTRACT

Fluoroelastomeric copolymers exhibiting high resistance to bases and alcohols, as well as high mechanical properties and low-temperature resistance, comprising, in moles:

4–75% of units of vinylidene fluoride;
12–40% of units of hexafluoropropene and/or perfluorovinylether and/or hydropentafluoropropene and/or chlorotrifluoroethylene;
2–35% of units of an olefin containing up to 4 carbon atoms;
2–60% of units of tetrafluoroethylene, provided that, when the sum of the olefin units and the perfluorovinylether units is equal to or greater than 70%, such copolymers possess a molecular weight sufficiently high to exhibit good mechanical characteristics.

16 Claims, No Drawings

FLUOROELASTOMERS BASED ON VINYLIDENE FLUORIDE EXHIBITING SUPERIOR RESISTANCE TO ORGANIC BASES

This is a continuation of U.S. Pat. Application Ser. No. 07/738,476, filed Jul. 31, 1991 now abandoned, which is incorporated by reference herein.

The present invention relates to novel fluoroelastomeric copolymers based on vinylidene fluoride (VDF), and comprising olefin and tetrafluoroethylene units, exhibiting high mechanical characteristics combined with a high resistance to chemicals, especially to nucleophilic agents and polar solvents.

The problem to be solved is to find a VDF based fluoroelastomer having the combination of properties indicated. In fact it is well known that the most common fluoroelastomers, i.e. VDF-based fluoroelastomers, comprising VDF/HFP copolymers and VDF/HFP/TFE, are not resistant to nucleophilic agents in a satisfactory way.

European Patent Application 335,705 describes elastomeric compositions vulcanizable with particular systems based on polyhydroxylated compounds and organoonium compounds, wherein the elastomeric polymer consists of units of vinylidene fluoride (VDF), tetrafluoroethylene (TFE) and an olefin, preferably propylene, whereas hexafluoropropene (HFP) units must be absent.

Said patent application states that the presence of hexafluoropropene units in VDF fluoroelastomers brings to fluoroelastomers which are attacked by nucleophilic agents. The deleterious effect induced under this respect by HFP, in VDF based fluoroelastomers, is also confirmed by Dennis E. Hull in "Elastomerics", January 1990, pages 11–16, and by W. M. Grootaert, Werner M., Kolb, Robert E. and Worm, Allen T., 1989, presented at the 1989 ACS Rubber Division Conference.

According to the last mentioned work, compositions of the type described in European Patent Application 335,705 are resistant to amine containing motor oils.

In the products described in such patent application, however, good elastomeric properties can be only obtained with a high hydrogenated olefin monomer content. This is at the expense of product stability toward swelling in oil.

Fluoroelastomeric polymers consisting of units derived from ethylene (E), TFE and perfluoroalkylvinylether—(PAVE)— are described in U.S. Pat. No. 4,894,045. These fluoroelastomers are said to possess high resistance to amines and strong bases, in addition to a good balance of properties at high and low temperatures.

These products exhibit however the disadvantage of not possessing the good processability characteristics deriving from the presence of VDF units. For this same reason, they are not suitable for ionic vulcanization with conventional crosslinking systems, and finally they require high alkylvinylether contents, at the expense of the product economics.

European Patent Application 131,308 describes terpolymers derived from tetrafluoroethylene, perfluoroalkylvinylethers and vinylidene fluoride, the last being in an amount not greater than 2% in moles based on the total moles. Vinylidene fluoride functions as a site for ionic vulcanization performed with non-conventional vulcanizing systems based, for instance, on polyhydroxylated compounds, in particular Bisphenol AF, and specific accelerators of the type of cyclic polyethers. According to this patent application, in order to obtain terpolymers exhibiting satisfactory resistance to amines, the vinylidene fluoride content should not exceed 0.4% in moles.

In U.S. Pat. No. 4,368,308 fluoroelastomeric polymers are described having resistance to chemicals, and to oils, as well as low-temperature resistance. Said polymers contain units of fluorovinylether (FV) and ethylene (E), in a molar ratio E/FV comprised between 95/5 and 30/70, with a total FV+E content of at least 70% in moles, wherein the possible balance to 100 may consist of other monomeric units deriving from TFE, VDF, HFP, chlorotrifluoroethylene etc.

Due to the predominant ethylene and perfluorovinylether content, the polymers of U.S. Pat. No. 4,368,308 cannot be obtained with molecular weights sufficiently high to render them useful for practical applications.

The object of the present invention is to provide novel elastomeric copolymers based on vinylidene fluoride, exhibiting high resistance to bases and alcohols, and in particular to amine containing oils, combined with optimal and elastomeric properties and having good processability. These copolymers comprise, in addition to VDF monomeric units, also monomeric units deriving from TFE, from olefin hydrocarbons (OL) as well as from at least one monomer selected among perfluorovinylether (PVE), hexafluoropropene (HFP), 1-hydropentafluoropropene (HFPE), and chlorotrifluoroethylene (CTFE), alone or in combination, such monomeric units being present in the following molar percentages:

| | |
|---|---|
| VDF | 4–75% |
| HFP and/or PVE and/or HFPE and/or CTFE | 12–40% |
| OL | 2–35% |
| TFE | 2–60% |

Copolymers wherein the molar percentage of HFP and/or PVE and/or HFPE and/or CTFE is comprised between 15 and 30% are preferred.

Preferred copolymers, according to the present invention, contain the above mentioned monomeric units in the following molar percentages:

| | |
|---|---|
| VDF | 10–70% |
| HFP and/or PVE and/or HFPE and/or CTFE | 15–30% |
| OL | 4–30% |
| TFE | 4–50% | or, even more preferably, the following molar composition:

| | |
|---|---|
| VDF | 20–70% |
| HFP and/or PVE and/or HFPE and/or CTFE | 18–27% |
| OL | 4–30% |
| TFE | 4–40% | with the general provision that, when the sum of OL+PVE is equal to or greater than 70% in moles, the copolymer possess an average molecular weight sufficiently high to exhibit good mechanical characteristics.

For sufficiently high average molecular weight according to the present invention it is meant a Mooney viscosity of at least 10 ML(1+10)$^{121}$, preferably ranging from 20 to 60 ML(1+10)$^{121}$.

Copolymers with a OL+PVE content equal to or higher than 70% in moles are preferably obtained by polymerization of the above monomers in the presence of a microemulsion formed by perfluoropolyoxyalkylene and water, in accordance to the method described in European Patent Application 250,767. Any other method capable of providing high molecular weight polymers can be used, as indicated below.

The olefin monomeric units present in the copolymers of this invention derive from olefins containing no more than 4 carbon atoms, having the general formula:

wherein $R_1$, $R_2$, $R_3$ and $R_4$ can independently be hydrogen atoms or alkyl groups having 1 or 2 carbon atoms. Examples of such olefins are given by ethylene, propylene, butene-1, butene-2.

Ethylone monomeric units are preferred. A mixture of said olefins can also be used.

The perfluorovinylether (PVE) units present in the copolymers of this invention can derive from perfluoroalkylvinylethers (PAVE) which contain alkyl groups having, preferably, 1-3 carbon atoms, and are for example perfluoromethylvinylether (MVE), perfluoroethylvinylether (EVE) and perfluoropropylvinylether (PVE). These units can also derive from perfluoroalkoxyalkylvinylethers (PAAVE) such as perfluoro-(2-n-propoxy)-propylvinylether; perfluoro-(2-methoxy)-propylvinylether; perfluoro-(3-methoxy)-propylvinylether; perfluoro-(2-methoxy)-ethylvinylether; perfluoro-(3,6,9-trioxa-5,8-dimethyl)-dodeca-1-ene, perfluoro-(5-methyl-3,6-dioxo)-1-nonene) and in general the perfluoroalkoxyalkylvinylethers described in U.S. Pat. No. 3,291,843.

Mixtures of units deriving from PAVE and PAAVE can be present in the copolymers.

Perfluoromethylvinylether units are preferred.

As already mentioned above, copolymers of this invention, in addition to high elastomeric characteristics and processing properties deriving from the presence of VDF units, show superior resistance to nucleophilic agents, for example especially to amines and amine containing oils, and also to polar solvents, for example alcohols.

In particular, exceptional resistance to amine containing oils is exhibited by elastomeric copolymers comprising, in moles, from 20 to 50% of VDF, from 10 to 30% of OL, from 10 to 35% of TFE and from 18 to 27% of HFP and/or PVE.

Copolymers of such composition can find application in the preparation of "shaft seals" possessing high and prolonged resistance to aminic additives containing motor oils combined with optimal mechanical and elastomeric properties, in particular a good low-temperature resistance.

Elastomeric copolymers containing, in moles, from 4 to 20% of VDF, from 20 to 35% of olefin, from 20 to 40% of TFE and from 18 to 27% of HFP and/or PVE exhibit exceptional resistance to organic bases, for example amines, and to polar solvents, for example low molecular weight alcohols and ketones, in addition to the advantage of being very rapidly vulcanizable with conventional vulcanizing agents.

Elastomeric copolymers according to this invention, containing, in moles, from 50 to 75% of VDF, from 2 to 15% of OL, from 2 to 15% of TFE and from 18 to 27% of HFP and/or PVE, in addition to good mechanical and elastomeric properties, possess an optimal balance of low-temperature resistance and resistance to alcohols.

Copolymers having such composition can be advantageously utilized in the preparation of manufactured articles intended for use in contact with alcohol containing fuels.

When the olefin is ethylene, the spectra of the elastomeric copolymers according to the invention, from NMR $^{19}$F analysis carried out in hexadeuteroaceton at room temperature with a spectrometer at 388 MHz, present peaks corresponding to "Chemical Shifts" of 96.3 ppm and 74.6 ppm, which can be respectively associated with the following structures:

These structures respectively correspond to the following monomeric diads:

a) $-CH_2-CF_2-CH_2-CH_2CH_2-$    (VDF)-(E)

b) $-CF_2-CF-CH_2CH_2-$    (HFP)-(E)
          |
          $CF_3$

The structures:

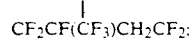

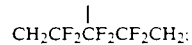

The above mentioned diads appear, in the copolymers according to this invention, together with other typical diads for copolymers based on VDF, of the Prior Art, such as:

d) $-CF_2-CF-CH_2-CF_2-$    (HFP)-(VDF)
          |
          $CF_3$ e) $-CF_2-CF_2-CH_2-CF_2-$    (TFE)-(VDF)

The structures:

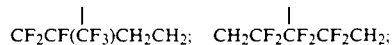

which can be associated, respectively, to "Chemical Shifts" of 75.3–75.5 ppm and 124–126 ppm, correspond to such sequences.

In the copolymers of the present invention there are also present (E)-(TFE) sequences, which can be identified by I.R.

The method of analysis consists in this case in preparing a copolymer film on a potassium bromide disk by evaporation from a copolymer solution in acetone and then examining the film in a FT-IR spectrometer.

By this technique it is possible to identify (E)-(TFE) sequences on the basis of the absorbances at 2880 cm$^{-1}$ and at about 1450 cm$^{-1}$ (1545 cm$^{-1}$) due to bending of CH$_2$ groups.

What said below concerning the NMR $^{19}$F peak identification in the presence of additional monomeric units, different from those of the present invention, also applies to the identification of the IR bands for E-TFE or (Olefin in general)-(TFE).

In the case of sequences with an olefin different from ethylene, the bands obviously fall at different frequencies than with ethylene.

The above mentioned peaks can vary in intensity depending on the concentration of the corresponding monomeric sequences and can be determined with difficulty at very low concentrations of such sequences.

Copolymers with olefins different from ethylene give in particular peaks characteristic of VDF-OL sequences.

These peaks obviously appear at frequencies different from those previously indicated for the presence of E.

In particular the above indicated peaks can be easily determined in the copolymers according to the invention obtained by polymerization in the presence of dispersions, emulsions or microemulsions of perfluoropolyoxyalkylenes in water utilizing the above mentioned comonomers. In particular, for the copolymer in example 1, obtained at the therein indicated temperature and pressure conditions, the frequencies at which the above indicated peaks appear can be easily determined.

The introduction of comonomers different from those mentioned above, which do not alter the above indicated resistance properties to organic bases and polar solvents, e.g. alcohols, nor the mechanical properties at low temperatures, could, however, alter or even determine the disappearance of the peak, for example for overlapping.

Obviously also the thus modified polymers come within the spirit and scope of the present patent application.

According to the present invention the term typical "peak" for the above indicated monomeric diads by NMR $^{19}$F analysis, also comprises the band determined by such peak.

For fluoroelastomeric copolymers according to the present invention, it is meant elastomers having preferably amorphous structure. However it can be also present a few percentage of crystallinity, in general up to 1-2% by weight. For elastoplastic applications however it can also be present a higher percentage of crystallinity, for example 8-10% or even 30-50% by weight; in this case very good mechanical properties can be obtained.

Preferably the copolymers of the present invention are those obtained with ethylene, vinylidene fluoride, hexafluoropropene, and tetrafluoroethylene, possibly also comprising MVE, and possibly modified with different additional monomers, as mentioned above.

Elastomeric polymers according to this invention can advantageously also comprise units deriving from iodine and/or bromine containing copolymerizable monomers, such as for instance iodo and/or bromo olefins containing from 2 to 10 carbon atoms, or fluoro-iodo and/or bromoalkylvinylethers, for example BVE, in an amount usually comprised between 0.05 and 2 moles per 100 moles of all the other monomeric units.

Furthermore the polymeric chains can contain iodine and/or bromine atoms at the end of the polymeric chain.

The preparation of the copolymers object of the present invention can be accomplished by polymerization of the monomers in emulsion in accordance to conventional techniques, preferably in the presence of radical initiators such as for example persulphates, perphosphates, perborates or alkaline or ammonium percarbonates, possibly in combination with reducing agents such as alkaline metal or ammonium sulphites, bisulphites, hyposulphites, phosphites, hypophosphites, or in combination with ferrous, cuprous o silver salts, or with other easily oxidable metal salts.

Surfactants, such as for example ammonium perfluorooctanoate, or other agents known to be suitable for the preparation of fluoroelastomers can be present in the polymerization medium.

Chain transfer agents can be used in general as molecular weight regulators. Comprised among them are chain transfer agents which contain iodine and/or bromine, such as for instance compounds having general formula Rf(I)$_x$(Br)$_y$ (Rf=perfluorinated hydrocarbon radical containing from 1 to 8 carbon atoms; x,y=integers comprised between 0 and 2, with at least x or y=1 and x+y≦2). Alkaline or alkaline earth metal iodides and/or bromides can be used as well, in accordance to what described in European Patent Application 407,937.

At the end of the polymerization, the fluoroelastomer is isolated from the polymeric latex by known methods, such as by coagulation by addition of electrolytes or by cooling.

The polymerization reaction can also be carried out in bulk or in an organic liquid containing an organic free radical initiator.

The polymerization reaction is generally carried out at temperatures comprised between 25° and 150° C., under pressures up to 10 MPa.

As previously mentioned, the preparation of elastomeric copolymers according to the invention is preferably carried out by polymerization in the presence of a microemulsion formed by one or more perfluoropolyoxyalkylenes and water, in accordance to the method described in European Patent Application 250,767.

The polymerization can be advantageously carried out also employing, instead of a microemulsion, an emulsion or dispersion of perfluoropolyoxyalkylenes and water in accordance to the method described in U.S. Pat. No. 4,789,717.

Other emulsions and dispersions of perfluorooxyalkylenes and water are described for instance in European Patent Applications 196,904, 280,312 and 360,292.

The copolymers of the present invention can be advantageously vulcanized using peroxidic methods when such copolymers contain iodine and/or bromine atoms on the chain and/or at a terminal position in the macromolecule. Peroxidic systems which can be used are well known in the Art, see for example European Patent Application 136,596.

The vulcanization of the copolymers of the invention can also be accomplished, preferably, using ionic methods.

The vulcanizing and accelerating agents are well known in the Art, for example, those described in U.S. Pat. No. 3,876,654, U.S. Pat. No. 4,259,463 and in European Patent Application 335,705.

Vulcanizing agents which can be cited in particular are aromatic or aliphatic polyhydroxy compounds and derivatives thereof.

They can be di-, tri- and tetrahydroxy-benzenes, naphthalenes, antracenes. Bisphenols in which the two aromatic rings are linked through a bivalent aliphatic, cycloaliphatic, aromatic radical having from 1 to 13 carbon atoms can also be used; or the linking radical is oxygen, sulphur, carbonyl, etc.. The aforementioned aromatic ring or rings can also be substituted with one or more chlorine, or fluorine, or bromine atoms, or by carbonyl, alkyl, acyl groups. See in particular European Patent Application 335,705 and U.S. Pat. No. 4,233,427.

As accelerators the ones cited in European Patent Application 335,705 can be employed, for example those indicated in U.S. Pat. No. 3,876,654 and U.S. Pat. No. 4,259,463.

However all accelerators indicated in European Patent Application 335,705 can be used.

The following can be indicated:

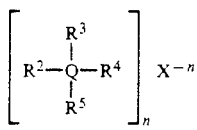

wherein
Q is N, P, As, Sb,

X is the organic or inorganic anion indicated in the cited European Patent Application, for instance chloride, sulphate, acetate, phosphate, phosphonate, hydroxide, alkoxide, phenoxide, bisphenoxide; n is the anion valence;

$R^2$, $R^3$, $R^4$, $R^5$ are alkyl, aryl groups or a combination thereof.

Various representative examples are indicated in the cited European Patent Application.

The class of amino-phosphonium salts is described in U.S. Pat. No. 4,259,463.

Other accelerators are the phosphoranes known in the Art, for instance in U.S. Pat. No. 3,752,787.

Additional accelerators are indicated in European Patent Application 182,299 A2 and 120,462 A1.

Mixed vulcanizing systems can be used as well, for instance ionic and peroxidic vulcanizing systems, as indicated in European Patent Application 136,596.

The following examples serve to illustrate the object of the present invention without having a limitative value. In the examples the following compounds are used:

Luperco 101 XL, sold as Lupercox ® by Pennwalt,
Taic: triallylisocyanurate
TB PCL: tetrabutylphosphonium chloride.

Preparation of a Microemulsion formed by a Perfluoro-polyoxyalkylene and Water.

14.5 ml of the compound having formula:

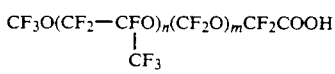

obtained according to European Patent Application EP 340,740 (Galden acid by Ausimont S.p.A.) having an average molecular weight=600, are mixed with 14,5 ml of 30% by volume NH$_4$OH in a glass container equipped with a stirrer operating under moderate stirring conditions. 29 ml of demineralized H$_2$O are subsequently added.

8.9 ml of the product having formula:

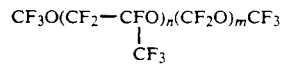

and having an average molecular weight of 450 are added to the thereby obtained solution.

A thermodynamically stable clear solution, microemulsion, is obtained by heating to a temperature of 85° C.

EXAMPLE 1

To a 10 l reactor in vacuum condition, equipped with a stirrer operating at 545 rpm, 6,500 g of water are added and the reactor is brought to pressure by a monomeric mixture having the following molar composition:

| VDF | 18% |
| HFP | 29% |
| MVE (perfluoromethylvinylether) | 34% |
| E (ethylene) | 5% |
| TFE | 14% |

The operating temperature is 85° C. and the pressure is 22 relative bar.

Thereafter the totality of the previously described microemulsion, heated to 85° C., is added and thereafter, in sequence:

13 g of ammonium persulphate (PSA), dissolved in water, 6.5 g of which added at the beginning and the remainder subdivided into 9 portions, of 0.72 g each, each added at every 10% conversion;

46 g of 2-bromoperfluoroethylvinylether, subdivided into 20 additions, of 2.3 g each, the first one executed before initiating the polymerization, and the subsequent ones at every 5% conversion;

6.4 g of CH$_2$I$_2$ (chain transfer agent) subdivided into 4 additions, of 1.6 g each, the first one executed at the beginning of the polymerization and the others at every 25% of monomer conversion.

A constant pressure is maintained during the polymerization, feeding the monomers in the following molar ratios:

| VDF | 23.5% |
| HFP | 5.6% |
| MVE | 16.0% |
| E | 28% |
| TFE | 26% |

2,900 g of polymer are obtained after 204 minutes. The reactor is cooled to room temperature, the emulsion is discharged and coagulated by addition of an aqueous solution of aluminum sulphate.

The polymer is separated, washed in water and dried in an air circulating oven at 60° C. for 24 hours. Table 1 reports data concerning the qualitative and quantitative composition of the polymer, the T$_g$ and Mooney viscosity values, as well as the presence of some sequences of monomeric diads as determined by NMR $^{19}$F and IR. Table 2 reports data concerning the formulation utilized for vulcanizing the polymer, the characteristics of such formulation, as well as those of the polymer as vulcanized, after post-vulcanization in an oven at 230° C. for 24 hours, and of its resistance to testing in amine containing oil, in the hereafter defined conditions. Vulcanization of the polymer has been carried out in a press at 170° C. for 10 minutes.

EXAMPLE 2

Operating conditions are in accordance with Example 1 with the difference that BVE is not added to the reaction mixture during the polymerization. After a polymerization time of 157 minutes, 2,290 g of polymer are obtained. Table 1 and 2 report the characteristics of the polymer, of the composition of the vulcanizing formulation and of the vulcanized product.

EXAMPLE 3

The reactor described in Example 1 is used, is brought to pressure with a monomeric mixture having the following molar composition:

| VDF | 29% |
|---|---|
| HFP | 41% |
| MVE | 13% |
| TFE | 14% |
| ETHYLENE | 3% |

The operating temperature is 85° C. and the pressure is 22 relative bar.

Feeding of the microemulsion and of PSA is carried out in accordance to Example 1. A total of 11.9 g of ethyl acetate as chain transfer agent are further added, 5.9 g of which at 5% monomer conversion, and the remainder subdivided into 4 additions of 1.5 g each, executed at 25%, 45%, 65% and 80% conversion, respectively.

The pressure is maintained constant during the polymerization by feeding a monomer mixture of the following molar composition:

| VDF | 40% |
|---|---|
| HFP | 14% |
| MVE | 7% |
| E | 20% |
| TFE | 19% |

After a 206 minutes time, 2,900 g of polymer are obtained. Tables 1 and 2 report the data concerning the characteristics of the polymer, the vulcanizing formulation and the vulcanized product.

EXAMPLE 4

Operating conditions are as in Example 1 with the exception that no microemulsion is added and that the reactor pressure is attained using a mixture having the following molar composition:

| VDF | 43% |
|---|---|
| HFP | 29% |
| MVE | 16% |
| E | 3% |
| TFE | 9% |

The pressure is maintained constant during polymerization by feeding a monomer mixture having the following molar composition:

| VDF | 60.5% |
|---|---|
| HFP | 14.5% |
| MVE | 7% |
| E | 8% |
| TFE | 6% |

After 90 minutes polymerization time 3,000 g of polymer are obtained.

Table 1 reports the characteristics of the obtained polymer. Table 3 reports the characteristics of the vulcanizing formulation and those of the vulcanized product.

EXAMPLE 5 (COMPARATIVE)

A copolymer prepared in accordance to European Patent Application 407,937 and having the composition and properties as reported in Tables 1 and 2 has been used as a comparison.

EXAMPLE 6 (COMPARATIVE)

A copolymer prepared in accordance to European Patent Application 407,937 and having the composition and properties as reported in Tables 1 and 2 has been used as a comparison.

EXAMPLE 7 (COMPARATIVE)

A copolymer prepared in accordance to European Patent Application 407,937 and having the composition and properties as reported in Tables 1 and 3 has been used as a comparison.

EXAMPLE 8

Operating conditions are as in Example 1 with the exception that the reactor is brought to pressure using a monomer mixture having the following molar composition:

| VDF | 4.5% |
|---|---|
| HFP | 28.5% |
| MVE | 37.0% |
| TFE | 24.0% |
| ETHYLENE | 6.0% |

The operating temperature is 85° C. and the pressure is 22 relative bar.

Feeding of the microemulsion and of PSA is performed as in Example 1.

The following additions are also made:
46 g of BVE, subdivided into 20 additions, 2.3 g each, the first one executed before the start of polymerization and the subsequent ones at every 5% conversion.
3.2 g of CH$_2$I$_2$, subdivided into four additions, 0.8 g each, the first one executed at the beginning of polymerization and the subsequent ones at every 25% of monomer conversion.

During the polymerization, the pressure is maintained constant by feeding the monomers in the following molar ratios:

| VDF | 6.0% |
|---|---|
| HFP | 7.0% |
| MVE | 18.0% |
| TFE | 34.0% |
| ETHYLENE | 35.0% |

After 184 minutes, 2,900 g of polymer are obtained. Tables 4 and 5 report data concerning the characteristics of the obtained polymer, the vulcanizing formulations and the vulcanized product.

EXAMPLE 9

Operating conditions are as in Example 8 with the exception that the reactor is brought to pressure using a monomer mixture having the following molar composition:

| | |
|---|---|
| VDF | 5.5% |
| HFP | 28.5% |
| MVE | 38.0% |
| TFE | 20.0% |
| ETHYLENE | 8.0% |

During the polymerization, the pressure is maintained constant by feeding a monomer mixture having the following molar composition:

| | |
|---|---|
| VDF | 10.0% |
| HFP | 7.0% |
| MVE | 18.0% |
| TFE | 30.0% |
| ETHYLENE | 35.0% |

After 215 minutes, 2,780 g of polymer are obtained. Tables 4 and 5 report data concerning the characteristics of the obtained polymer, the vulcanizing formulation and the vulcanized product.

EXAMPLE 10

Operating conditions are as in Example 8 with the exception that the reactor is brought to pressure using a monomer mixture having the following molar composition:

| | |
|---|---|
| VDF | 3.0% |
| MVE | 68.5% |
| TFE | 20.0% |
| ETHYLENE | 8.5% |

During the polymerization, the pressure is maintained constant by feeding a monomer mixture having the following molar composition:

| | |
|---|---|
| VDF | 4.0% |
| MVE | 35.5% |
| TFE | 20.5% |
| ETHYLENE | 40.0% |

After 156 minutes, 3,140 of polymer are obtained. Tables 6 reports data concerning the characteristics of the obtained polymer, the vulcanizing formulation and the vulcanized product.

Chemical Resistance to Oils

The test for resistance to oils mentioned in the examples have been performed using ASTM 3 oil containing 1% in volume of benzylamine dissolved therein, by maintaining a standard sample, vulcanized in press at 170° C. for 10 minutes and post-treated in oven at 230° C. for 24 hours, immersed in oil for 3 days at 160° C., using a sample/oil volume ratio of 1/10. Tensile properties and sample volume variations have been measured after such treatment. Results reported in the table refer to the percent variation in samples properties after treatment in oil.

TABLE 1

| | Example | | | | | | |
|---|---|---|---|---|---|---|---|
| | 1 | 2 | 3 | 4 | 5 (compar.) | 6 (compar.) | 7 (compar.) |
| Polymer Composition: | | | | | | | |
| - (% moles) | | | | | | | |
| VDF | 27.7 | 28.0 | 43.0 | 63.0 | 53.8 | 58.2 | 77.8 |
| HFP | 7.6 | 7.5 | 14.0 | 14.0 | 21.5 | — | 21.6 |
| PFMVE | 17.0 | 16.8 | 7.5 | 7.5 | — | 17.7 | — |
| E | 21.0 | 21.3 | 17.5 | 8.0 | — | — | — |
| TFE | 26.4 | 26.4 | 18.0 | 7.1 | 23.9 | 23.4 | — |
| BVE | 0.3 | — | — | 0.4 | 0.8 | 0.7 | 0.6 |
| - (% weight) | | | | | | | |
| VDF | 19.5 | 20.0 | 32.8 | 47.9 | 37.1 | 40.5 | 59.4 |
| HFP | 12.6 | 12.6 | 25.0 | 24.9 | 34.8 | — | 38.6 |
| MVE | 31.4 | 31.2 | 14.8 | 14.7 | — | 32 | — |
| E | 6.5 | 6.7 | 5.8 | 2.7 | — | — | — |
| TFE | 29.1 | 29.5 | 21.5 | 8.4 | 25.8 | 25.4 | — |
| BVE | 0.9 | — | — | 1.3 | 2.4 | 2.1 | 2.0 |
| Hydrogen | 1.5 | 1.6 | 1.9 | 1.9 | 1.2 | 1.3 | 1.9 |
| Mooney Viscosity $ML^{121}(1 + 10)$ | 28 | 37 | 52 | 18 | 26 | 46 | 44 |
| $T_2$ (DSC) (°C.) | −10 | −10 | −12 | −23 | −9 | −28 | −23 |
| Presence of Monomeric Diads | | | | | | | |
| VDF-E | Yes | Yes | Yes | Yes | No | No | No |
| HFP-E | Yes | Yes | Yes | Yes | No | No | No |
| TFE-E | Yes | Yes | Yes | Yes | No | No | No |
| HFP-VDF | Yes | Yes | Yes | Yes | Yes | No | Yes |
| TFE-VDF | Yes | Yes | Yes | Yes | Yes | Yes | No |

Operating conditions are as in Example 8 with the exception that the reactor is brought to pressure using a

TABLE 2

| | Example | | | | |
|---|---|---|---|---|---|
| | 1 | 2 | 3 | 5 | 6 |
| Composition of Vulcanizing Formulation | | | | | |
| Polymer | 100 | 100 | 100 | 100 | 100 |
| Luperco 101 XL | 3 | — | — | 3 | 3 |

TABLE 2-continued

|  | Example | | | | |
|---|---|---|---|---|---|
|  | 1 | 2 | 3 | 5 | 6 |
| Taic | 3 | — | — | 3 | 3 |
| ZnO | 5 | — | — | 5 | 5 |
| Bisphenol AF | — | 2.5 | 1.9 | | |
| TB PCL | — | 0.83 | 0.68 | | |
| Ca(OH)$_2$ | — | 6 | 6 | | |
| MgO | — | 6 | 6 | | |
| Sulpholane | — | 0.5 | 0.5 | | |
| Black MT | 30 | 30 | 30 | 30 | 30 |
| Formulation Characteristics | | | | | |
| ML (pounds × inch) | 10 | 10 | 17 | 14 | 14 |
| MH (pounds × inch) | 70 | 74 | 101 | 97 | 103 |
| t$_{,2}$ (s) | 69 | 294 | 234 | 60 | 54 |
| t'$_{90}$ (s) | 192 | 918 | 366 | 288 | 261 |
| Characteristics of Vulcanized Product after Post-Vulcanization: at 170° C. for 10 min in press followed by oven aging at 230° C. for 24 hrs (Stress-Strain) (ASTM D412-83) | | | | | |
| M 100 (MPa) | 8.5 | 9.4 | 9.4 | 6.0 | 7.0 |
| C.R. (MPa) | 19 | 17 | 17.0 | 19 | 15 |
| A.R. (%) | 181 | 180 | 170 | 190 | 175 |
| Shore A (ASTM D 2240-81) | 71 | 81 | 79 | 73 | 72 |
| Chemcial Resistance Tests (Aging in ASTM 3 Oil Containing 1% Benzylamine) | | | | | |
| Variation M 100 (%) | +1.2 | +5 | +6.5 | not measured for breakage | −4.4 |
| Variation C.R. (%) | −3.4 | −6 | −14 | −70.3 | −23.2 |
| Variation A.R. (%) | −2.4 | −4 | −7 | −55.2 | −10.9 |
| Volume Variation (%) | +3.3 | +3.5 | +4 | +3.8 | +2.0 |

M = Modulus; C.R. = Load at Break; A.R. = Elongation at Break.

TABLE 3

|  | Example | |
|---|---|---|
|  | 4 | 7 |
| Vulcanizing Formulation (% moles) | | |
| Polymer | 100 | 100 |
| Luperco 101XL | 3 | 3 |
| Taic | 3 | 3 |
| ZnO | 5 | 5 |
| Black MT | 30 | 30 |
| Formulation Characteristics | | |
| ODR 177 C ARC ± 3 (ASTM D 2084-81) | | |
| ML (pounds × inch) | 5 | 16 |
| MH (pounds × inch) | 95 | 85 |
| t$_{,2}$ (s) | 66 | 60 |
| t'$_{90}$ (s) | 219 | 267 |
| Characteristics of Vulcanized Product after Post-Vulcanization (at 170° C. for 10 min followed by oven aging at 230° C. for 24 hrs) (Stress-Strain) (ASTM 412-83) | | |
| M 100 (MPa) | 5.9 | 5 |
| C.R. (MPa) | 18.6 | 18 |
| A.R. (%) | 203 | 220 |
| Shore A (ASTM D2240-81) | 70 | 68 |
| Low-Temperature Behavior (ASTM D 1329) | | |
| T.R. 10% (°C.) | −17.5 | −17 |
| T.R. 30% (°C.) | −14.4 | −14 |
| T.R. 50% (°C.) | −12.3 | −12 |
| Chemical Resistance | | |
| Swelling in Methanol (%) | +10 | +80 |

T.R. = Temperature of Retraction

TABLE 4

|  | Example | |
|---|---|---|
|  | 8 | 9 |
| Polymer Composition: | | |
| - (% moles) | | |
| VDF | 6.5 | 11.1 |
| HFP | 7.3 | 7.7 |
| PFMVE | 16.7 | 15.8 |
| E | 34.9 | 33.4 |
| TFE | 34.2 | 31.5 |
| BVE | 0.4 | 0.5 |
| - (% weight) | | |
| VDF | 4.7 | 8.1 |
| HFP | 12.5 | 13.3 |
| PFMVE | 31.5 | 30.1 |
| E | 11.1 | 10.7 |
| TFE | 38.9 | 36.2 |
| BVE | 1.3 | 1.6 |
| Hydrogen | 1.7 | 1.8 |
| Mooney Viscosity ML(1 + 10)$^{121}$ | 64 | 44 |
| Tg (DSC) (°C.) | −3.5 | −3.2 |
| Presence of Monomeric Diads: | | |
| VDF-E | Yes | Yes |
| HFP-E | Yes | Yes |

TABLE 4-continued

|  | Example 8 | Example 9 |
|---|---|---|
| TFE-E | Yes | Yes |
| HFP-VDF | Yes | Yes |
| TFE-VDF | Yes | Yes |

TABLE 5

|  | Example 8 | Example 9 |
|---|---|---|
| Vulcanizing Formulation: |  |  |
| Polymer | 100 | 100 |
| Luperco 101XL | 3 | 3 |
| Taic | 3 | 3 |
| ZnO | 5 | 5 |
| Black MT | 30 | 30 |
| Formulation Characteristics: |  |  |
| ODR 177° C. ARC ± 3 (ASTM D 2084-81) |  |  |
| ML (pounds × inch) | 17 | 12 |
| MH (pounds × inch) | 78 | 73 |
| $t_{,2}$ (s) | 69 | 66 |
| $t'_{90}$ (s) | 219 | 204 |
| Characteristics of Vulcanized Product after Post-Vulcanization (at 170° C. for 10 min followed by oven aging at 230° C. for 24 hrs) (Stress-Strain) (ASTM 412-83) |  |  |
| M 100 (MPa) | 10.2 | 9.9 |
| C.R. (MPa) | 23.8 | 22.7 |
| A.R. (%) | 201 | 190 |
| Shore A (ASTM D2240-81) | 90 | 76 |
| Chemical Resistance Tests |  |  |
| 1/26 (in ASTM 3 Oil + 1% Benzylamine - 3 Days - 160° C.) |  |  |
| Variation M 100 (%) | 3.6 | −2.5 |
| Variation C.R. (%) | −6.1 | −4.5 |
| Variation A.R. (%) | 0 | 4.9 |
| Volume Variation (%) | 2.9 | 3 |

TABLE 6

|  | Example 10 |
|---|---|
| Polymer Composition: |  |
| - (% moles) |  |
| VDF | 5.2 |
| MVE | 32.5 |
| E | 41.3 |
| TFE | 20.8 |
| BVE | 0.2 |
| - (% weight) |  |
| VDF | 3.7 |
| MVE | 59.8 |
| E | 12.8 |
| TFE | 23.0 |
| BVE | 0.6 |
| Hydrogen | 0.6 |
| Mooney Viscosity ML(1 + 10)$^{121}$ | 53 |
| Tg (DSC) (°C.) | −7.8 |
| Vulcanizing Formulation |  |
| Polymer | 100 |
| Luperco 101XL | 3 |
| Taic | 4 |
| ZnO | 5 |
| Black MT | 30 |
| Formulation Characteristics |  |
| ODR 177° C. ARC ± 3 (ASTM D 2084-81) |  |
| ML (pounds × inch) | 15 |
| MH (pounds × inch) | 69 |
| $t_{,2}$ (s) | 66 |
| $t'_{90}$ (s) | 222 |
| Characteristics of Vulcanized Product after Post-Vulcanization (230° C. - 24 hrs) (Stress-Strain) (ASTM 412-83) |  |
| M 100 (MPa) | 10 |
| C.R. (MPa) | 20.4 |
| A.R. (%) | 193 |

TABLE 6-continued

|  | Example 10 |
|---|---|
| Shore A (ASTM D 2240-81) | 78 |

I claim:

1. A fluoroelastomeric copolymer exhibiting high resistance to bases and alcohols, good mechanical properties and low-temperature resistance, and comprising, in mole percentages:
    a) 4-75% of vinylidene fluoride (VDF) units;
    b) 12-40% of units selected from the group consisting of hexafluoropropene(HFP), perfluorovinylether (PVE), hydropentafluoropropene (HEPE), chlorotrifluoroethylene (CTFE) and mixtures thereof;
    c) 2-35% of units of an olefin (OL) having 2 to 4 carbon atoms; and
    d) 2-60% of tetrafluoroethylene (TFE) units; wherein, when the total percentage of OL and PVE is equal to or greater than 70%, the Mooney viscosity of the copolymer is at least 10 ML(1+10)$^{121}$.

2. The copolymer of claim 1 wherein, when the total percentage of OL and PVE is equal to or greater than 70%, the Mooney viscosity is between 20 and 60 ML(1+10)$^{121}$.

3. The copolymer of claim 1, wherein the mole percentage of compound b) is 15-30%.

4. The copolymer of claim 1, wherein the mole percentages of components a), b), c) and d) are:
    a) 10-70%;
    b) 15-30%;
    c) 4-30%;
    d) 4-50%.

5. The copolymer of claim 1, wherein the mole percentages of components a), b), c) and d) are:
    a) 20-70%;
    b) 18-27%;
    c) 4-30%;
    d) 4-40%.

6. The copolymer of claim 1, wherein component b) is HFP, PVE or a mixture thereof, and the mole percentages of components a), b), c) and d) are:
a) 20-50%;
b) 18-27%;
c) 10-30;
d) 10-35%.

7. The copolymer of claim 1, wherein component b) is HFP, PVE or a mixture thereof, and the mole percentages of components a), b), c) and d) are:
a) 4-20%;
b) 18-27%;
c) 20-35%;
d) 20-40%.

8. The copolymer of claim 1, wherein component b) is HFP, PVE or a mixture thereof, and the mole percentages of components a), b), c) and d) are:
a) 50-75%;
b) 18-27%;
c) 2-15%;
d) 2-15%.

9. The copolymer of claim 1, wherein component b) is HFP or a mixture of HFP and perfluoromethylvinylether (MVE), component c) is ethylene (E), and the copolymer chains comprise sequences of the following monomer dyads:
VDF-E;
HFP-E; and
TFE-E.

10. The copolymer of claim 1, wherein component b) is MVE, component c) is ethylene (E), and the copolymer chains comprise sequences of the following monomer dyads:
VDF-E; and
TFE-E.

11. The copolymer of claim 1, which comprises from 0.05 to 2 mole %, based on the total moles of components a), b), c) and d), of units selected from the group consisting of iodo- and bromo-olefins, bromoalkylvinylethers and mixtures thereof.

12. An elastomeric copolymer obtained from the copolymer of claim 11 by vulcanization with peroxides.

13. The copolymer of claim 1, containing terminal atoms of iodine, bromine or mixtures thereof.

14. An elastomeric copolymer obtained from the copolymer of claim 13 by vulcanization with peroxides.

15. An elastomeric copolymer obtained from the copolymer of claim 1 by ionic vulcanization.

16. The elastomeric copolymer of claim 15, wherein the ionic vulcanization is carried out with bisphenol AF and a quaternary phosphonium or ammonium salt.

* * * * *